United States Patent [19]

Paladini

[11] Patent Number: 5,434,428
[45] Date of Patent: Jul. 18, 1995

[54] LENGTH MEASUREMENT SYSTEM ALONG UV-SHAPED CONVEYOR USING DATA FROM OBJECT SENSORS

[76] Inventor: Rene P. Paladini, 164 Tinsman Rd., Frenchtown, N.J. 08825

[21] Appl. No.: 164,201

[22] Filed: Dec. 9, 1993

[51] Int. Cl.⁶ .......................................... G01N 21/86
[52] U.S. Cl. ........................ 250/559.24; 250/223 R; 356/383
[58] Field of Search ............... 250/560, 223 R; 356/383, 379; 209/586

[56] References Cited

U.S. PATENT DOCUMENTS

| | | | |
|---|---|---|---|
| 4,015,123 | 3/1977 | Small et al. | 250/223 R |
| 4,043,673 | 8/1977 | Harris et al. | 356/160 |
| 4,392,204 | 7/1983 | Prim et al. | 364/478 |
| 4,432,457 | 2/1984 | Sawa et al. | 209/557 |
| 5,150,307 | 9/1992 | McCourt et al. | 364/478 |

*Primary Examiner*—David C. Nelms
*Assistant Examiner*—Steven L. Nichols
*Attorney, Agent, or Firm*—Louis Weinstein

[57] ABSTRACT

A pair of conveyor belts arranged to form a substantially V-shaped conveying path for slender, elongated tubular members of a predetermined length. A small gap is provided between the conveyor belts at the apex of the V-shaped conveyor assembly. A light transmitter directs a beam across one of the conveyor belts and into the gap toward a receiver. A member to be measured lies in the V-shaped groove periodically breaking the beam according to the length thereof. A pulse generator develops output pulses at a rate determined by the linear speed of the conveyor. First and second detectors count pulses at the initiation and determination of a detector beam to each determine a length. The length of the workpiece is determined by taking an average of the two values. The counts are also employed to assure accuracy of the system by confirming that the counts obtained as a leading edge of a workpiece passes the first and second detectors provide a difference value which is equal to the actual distance between the first and second detectors.

47 Claims, 8 Drawing Sheets

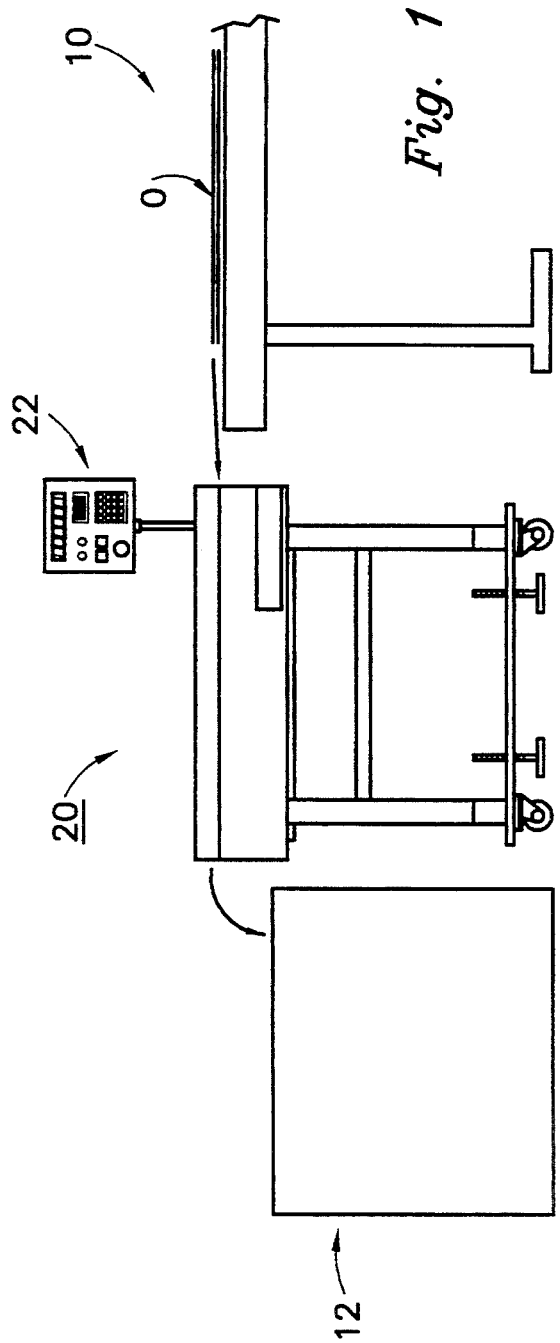
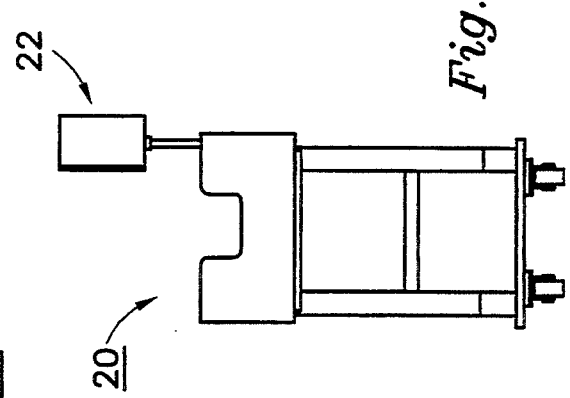
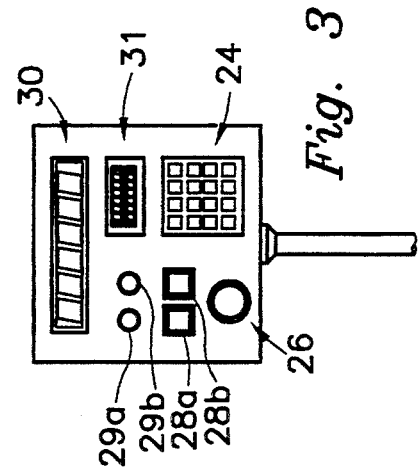

TO FIG. 6b

LENGTH MEASUREMENT SYSTEM ALONG UV-SHAPED CONVEYOR USING DATA FROM OBJECT SENSORS

FIELD OF THE INVENTION

The present invention relates to measurement apparatus and more particularly to novel method and apparatus for accurately measuring elongated members such as extruded members in real time.

BACKGROUND OF THE INVENTION

Numerous applications exist wherein it is desirable to measure the length of long, thin objects. For example, it is extremely desirable to accurately measure the length of elongated objects produced, for example, by an extrusion process such as, for example, tubular-shaped rubber or plastic members.

A variety of extrusion and cutting devices exist which are capable of extruding and cutting predetermined lengths of tubular material at a rate of the order of 25 meters per minute. It is thus desirable to accurately measure the output of an extruder, for example, rapidly and accurately and in real time without imposing any delay on the extrusion and cutting processes.

BRIEF DESCRIPTION OF THE INVENTION

The present invention is characterized by comprising method and apparatus for receiving, handling and measuring, thin, elongated members and particularly extruded members employing conveying and measuring apparatus which is characterized by comprising conveying apparatus utilizing a pair of belt conveyors arranged in a V-shaped configuration for receiving and conveying extruded product in the trough of the V-shaped conveyor assembly and including detector means which utilize a gap between the conveyors at the apex thereof which create a light path which when broken by the passage of product, is utilized for determining product length. Measurement of product length is enhanced through the utilization of first and second detector means taking two independent readings, an average being taken of the two readings to enhance measurement accuracy.

The positions of the first and second sensing means are staggered and the known value separating the staggered sensing means is utilized as a reference to further validate correct measurement.

Alternative embodiments respectively employ pairs of sensor arrays and laser scanning arrays. Multiple readings are taken and averaged in a manner similar to the scanning and measuring technique described above.

Means are provided to maintain the conveyor belt advancing product to move together and at the same speed to facilitate accurate measurement. The electronic system is accurate to at least plus or minus one percent ($\pm 1\%$) of length measurements greater than one meter and is capable of measurement rates of up to one hundred parts per minute. The system handles products having a diameter up to 50 mm and can handle products of non-regular shape and/or non-regular length at conveying speeds that have no theoretical limit.

OBJECTS OF THE INVENTION

It is therefore one object of the present invention to provide novel method and apparatus for accurately measuring thin, elongated workpieces utilizing multiple detector and measurement means and determining an average value based on the multiple measurements to facilitate accurate measurement.

Another object of the present invention is the providing of a measurement system including V-shaped conveying means having a gap at the apex thereof and detector means utilizing said gap to detect product conveyed thereon.

The above, as well as other objects of the present invention will become apparent upon reading the accompanying description and drawings.

BRIEF DESCRIPTION OF THE FIGURES

FIG. 1 shows a side elevation of product extrusion and cutting operation employing the system of the present invention.

FIG. 2 shows an end view of the measurement detection apparatus shown in FIG. 1.

FIG. 3 shows a detailed view of the control panel employed in the measurement system of the present invention.

DETAILED DESCRIPTION OF THE INVENTION AND PREFERRED EMBODIMENTS THEREOF

Figure 4:
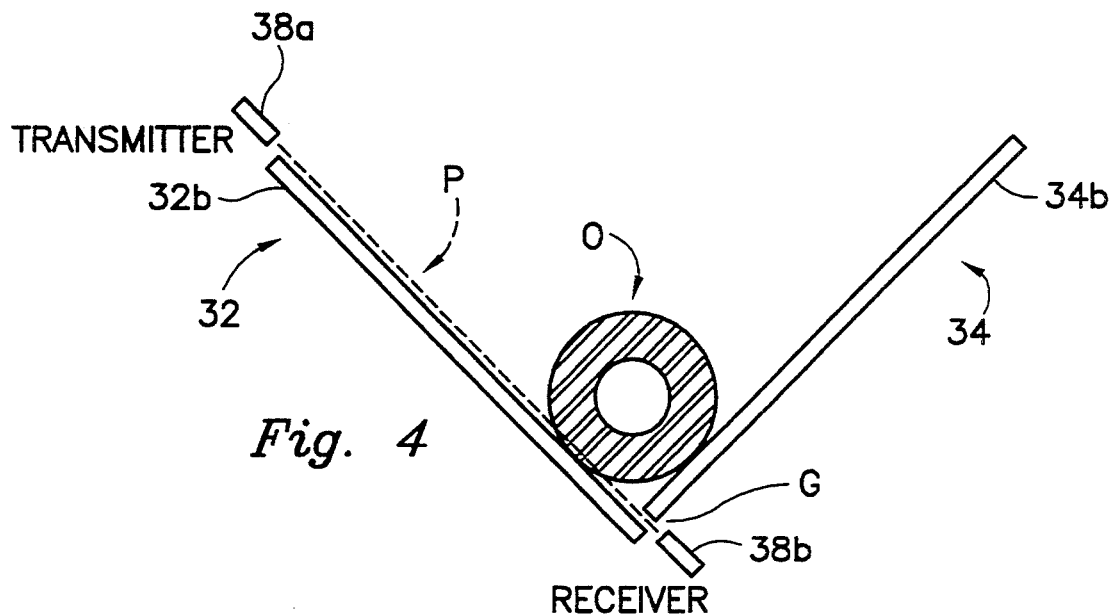
FIG. 4 shows a sectional view of the conveying system employed in the measurement system of the present invention.
Figure 4A:
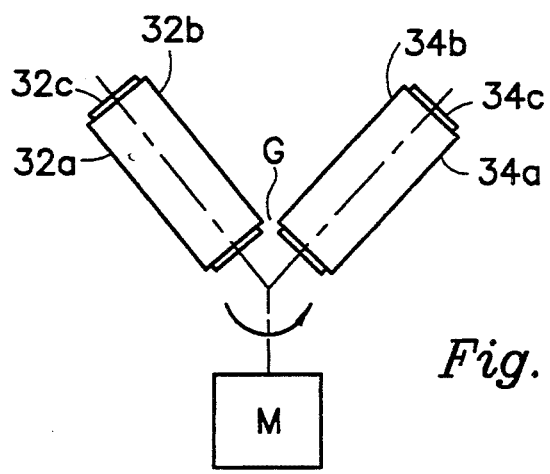
FIGS. 4a and 4b show additional end and side views of the conveying system of FIG. 4.
Figure 4B:
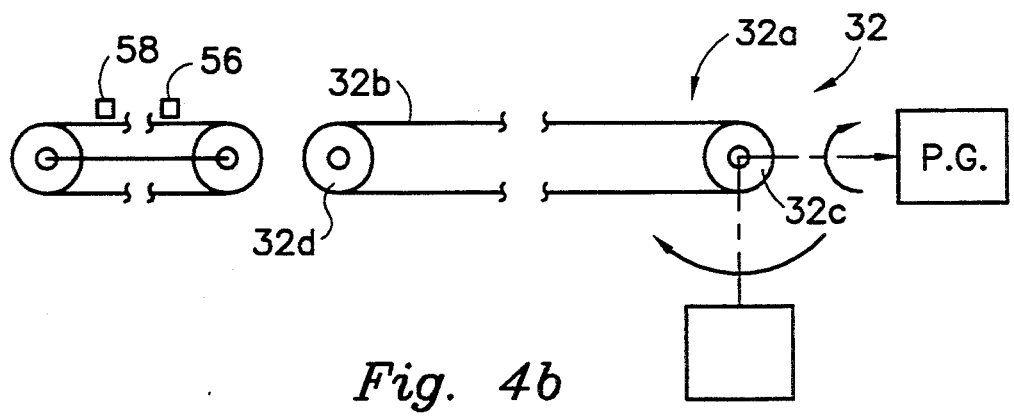

FIG. 1 shows a system including a conveyor means 10 for receiving slender, elongated product 0 produced, for example, by an extruder (not shown) and cut into predetermined lengths. Conveyor means 10 delivers successive lengths of extruded material to measuring apparatus 20 arranged at the downstream end of conveyor means 10 for receiving and conveying product past plural detector means (to be more fully described). After measurements of the cut lengths are completed, the cut lengths are delivered by conveyor means forming part of the measurement apparatus 20 (to be more fully described) into suitable collection means such as, for example, a collection hopper 12.

The exit conveyor means 10 for delivering cut lengths from an extruder/cutter means (not shown) is preferably operated to have a conveyor speed which is slightly faster than the extrusion/cutting line to provide a gap between cut lengths. Each cut length is guided off the downstream end of the exit conveyor means 10 into the length measurement system 20.

Length measurement system 20 conveys each cut length in a successive fashion through several optical sensors (to be more fully described) which automatically locate the ends of each length. Plural measurements are obtained using two independent methods. When the measurements agree, the length is displayed. If the measurements do not agree, a fault is displayed. The measured part can be remeasured, if desired.

Length measurement system 20 will accept cut lengths up to 100 meters. Minimum length capable of being measured is substantially dependent on the ratio of part length to cross-section since a cut length could fall over during conveying and the cross-section dimension could be incorrectly measured.

Subsequent to measurement, the part 0 exits the length measurement system 20 and is deposited into a collector 12 or another conveyor, for example.

Figure 5:
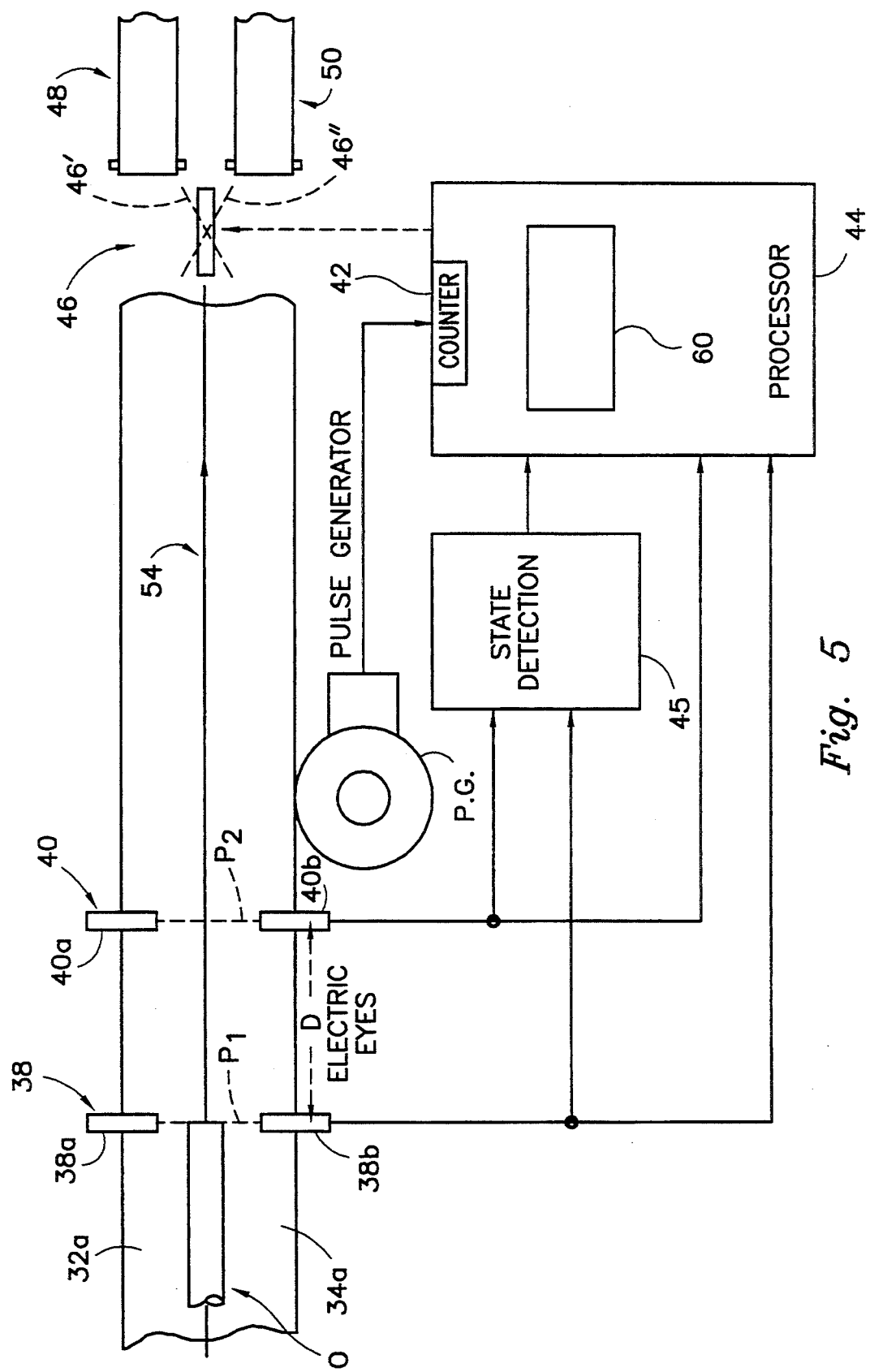
FIG. 5 shows a schematic diagram of the electronics employed in the measuring system of the present invention.

As an alternative, automatic sorting may be utilized after measurement by diverting each measured length to an appropriate collection receptacle. For example, a conveyor may be positioned at the downstream end of length measurement system 20 wherein the length of the conveyor is chosen to accommodate cut lengths up to a predetermined maximum. A diverter may be provided to divert cut lengths from a centerline position as shown in FIG. 5 to either a first or a second receptacle (not shown) respectively positioned to the left and to the right of the centerline for respectively collecting cut lengths whose measurements are respectively acceptable and unacceptable.

An operator can enter alarm limits on control panel 22 of the length measurement system 20 which panel is provided with an input keypad 24, speed control knob 26, on/off control push buttons 28a and 28b, tolerance and fault lights 29a and 29b, length display 30, and operator display 31.

Panel lights 28a, 28b indicate the status of each measurement as well as faults, as was described above. Alarm limits are set to dimensions over which and under which a measured length is considered to lie out of the adjustably set tolerance values. The display may provide measurements in either the English or metric system. The measurement of each cut length is displayed immediately and in real time.

A measurement operation is initiated simply by depressing on switch 26a and adjusting the speed of the internal conveyor by adjusting speed control knob 24 so as to match or slightly exceed the speed of the exit conveyor means 10.

Each valid length dimension may be collected by an output computer located, for example, at the extrusion line for use in making appropriate adjustments at the extruder and/or cutter and further to provide hard copy output which may travel along with and/or identify each measured product.

The length measurement system 20 further comprises conveyor means including first and second conveyors 32, 34 arranged with their upper runs 32a, 34a oriented in a V-shaped pattern, as shown in FIGS. 4, 4a, 4b and 5.

Each conveyor is comprised of conveyor belts 32a, 34a each having an upper run 32b, 34b, as shown. Since each conveyor is substantially identical in design and function, a detailed description of only one of said conveyors will be set forth herein for purposes of simplicity. Conveyor 32 is comprised of a drive roller 32c and driven roller 32d. Conveyor belt 32a is entrained about these rollers. Intermediate, free-wheeling rollers may be arranged at spaced intervals between rollers 32c, 32d, if desired.

Both conveyors 32, 34 are simultaneously driven by motor M so that both sides of the object O being guided for measurement and driven therealong are moving at the same rate.

Conveyor belts 32 and 34 are preferably arranged to form an enclosed angle of 45 degrees for supporting object O which, as was previously described, may be a slender, elongated extruded member such as a hollow, tubular-shaped member. Conveyed part O passes through two spaced detector stations respectively provided with detector assemblies 38 and 40. Each of the detectors signals when a part passes between the light source/light sensor elements and interrupts the optical path therebetween.

Each of the detectors may comprise a transmitter such as, for example, the transmitter 38a and a receiver 38b arranged on the underside of upper runs 32b, 34b of conveyors 32, 34 and aligned with the gap G provided between adjacent longitudinal edges of upper runs 32b, 34b which define the apex of the V-shaped configuration. As an alternative, transmitter 38a may, for example, be a reflective member and receiver 38b may be a combination light source/receiver which transmits a light beam to the reflector and receives a light beam when the object O no longer interrupts the optical path as shown by dotted line P.

The detector assemblies 38 and 40 are arranged a predetermined spaced distance D apart. A pulse generator PG is coupled to the conveyors for generating pulses at a rate which is a function of the linear speed of the conveyors, each pulse representing a given unit of displacement.

Pulses from pulse generator PG are applied to the input of counter 42. Each change of state of the detectors 38, 40 is detected at state detection circuit 45. An interrupt pulse is applied to microprocessor 44 from circuit 45 causing the count in counter 42 at that time to be transferred to a memory. The transferred count is tagged by the detector 38b or 40b pausing the change of state.

Operation of the detection and length measuring system is as follows:

The leading edge of a cut length O interrupts the optical path $P_1$ of first detector 38, causing circuit 45 to generate a change of state signal. The count in counter 42 is saved in a suitable memory location within microprocessor 44 (this count is designated herein as count a due to detector 38b providing a signal indicating that detector 38b caused the change of state). The leading edge of the same part thereafter interrupts optical path $P_2$. The count at this time is saved and transferred to memory (hereinafter count b). By computing b-a and comparing the result against a stored amount representing distance D, accuracy of the measurement system is confirmed.

The trailing edge of the part O passes beyond optical path $P_1$, reestablishing the optical path, the count in counter 42 is saved (hereinafter count c tagged as a value caused by a change of state of detector 38a). Similarly, when the trailing edge passes optical path $P_2$, reestablishing the optical path $P_2$, the count in counter 42 is saved (hereinafter count d identified as being caused by a change of state of detector 40b).

The length is calculated as:

$$l = \frac{(c - a) + (d - b)}{2}$$

The two differences correspond to individual measurements and are compared with each other to verify the measurement. The sequence of detector states is monitored to verify correct measurement sequence. Counter 42 is selected to have an adequate count capacity and when it reaches capacity, automatically restarts without resetting. As one example of verification, counts a and b are compared and based on the known distance between the detectors the differences between these counts is utilized to verify accuracy of the detector system. Counts c and d may be compared and verified in the same way. For example, the distance D between detectors 38 and 40 should be exactly equal to the value b-a and d-c (or within a predetermined tolerance).

Each cut length is compared to upper and lower limits preset into the microprocessor by the keypad 24 and the measurements of the detectors are compared to the upper and lower limits. Alternatively, the average value l may be compared against the upper and lower limits and when these limits are exceeded, a reject signal is provided. A diverter mechanism 46 may be utilized to deflect measured product to one of output conveyors 48 and 50. For example, given that a cut length of an object O is outside of the tolerance limits, deflector 46 moves to position 46' to deflect cut object O to conveyor 48. Conversely, when the cut length O is within the desired limits, the deflector assembly moves to the position 46" deflecting the cut length to conveyor 50. Each cut length which lies outside of one of at least one of the tolerance limits is deflected in this manner.

The measuring system need not be limited to two measuring detectors. For example, three (3), four (4), or more detectors may be used in order to further enhance measurement accuracy. Repeating equation (1) above for "n" detectors where n=1, 2, 3, ... we have:

$$l = \frac{(c - a) + (d - b) + ( \ldots )}{n}$$

As an alternative arrangement (see FIG. 4b), a single conveyor may be aligned with the path of movement 54 and each cut length which is outside of the tolerance limits is tagged as a reject by microprocessor 44. This value is placed in a dynamic stack in computer memory. As each part passes a detector 56 when such part is identified as a reject, a signal g (FIG. 5) is generated by the microprocessor to operate a device 58 to remove the reject product from the belt.

All of the measurement values as well as initial settings are selectively displayed on an LCD display 60 forming part of the microprocessor. Data accumulated by the microprocessor may be sent to a data collection computer (not shown).

Figure 6A:
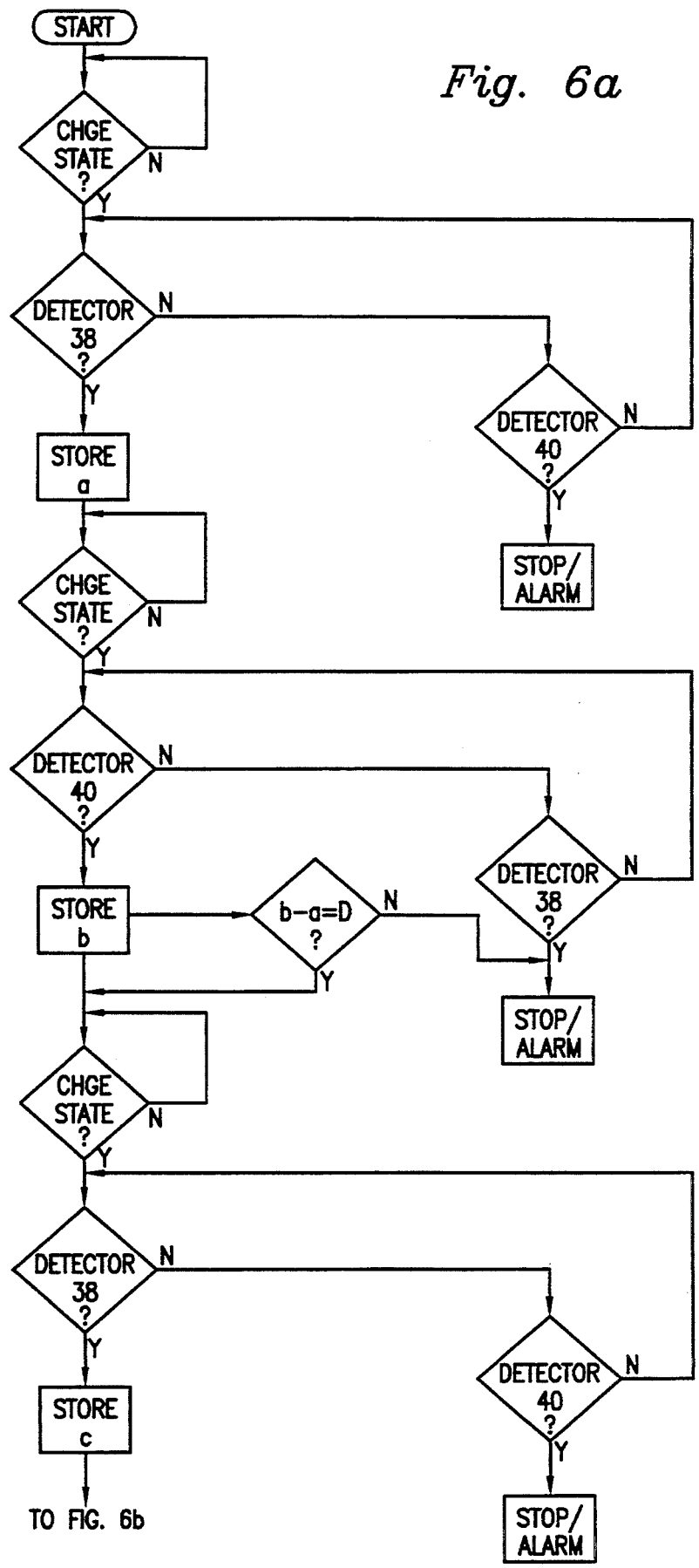
FIGS. 6a and 6b, taken together, comprise a flow diagram of the measurements computed by the system shown in FIG. 5.
Figure 6B:
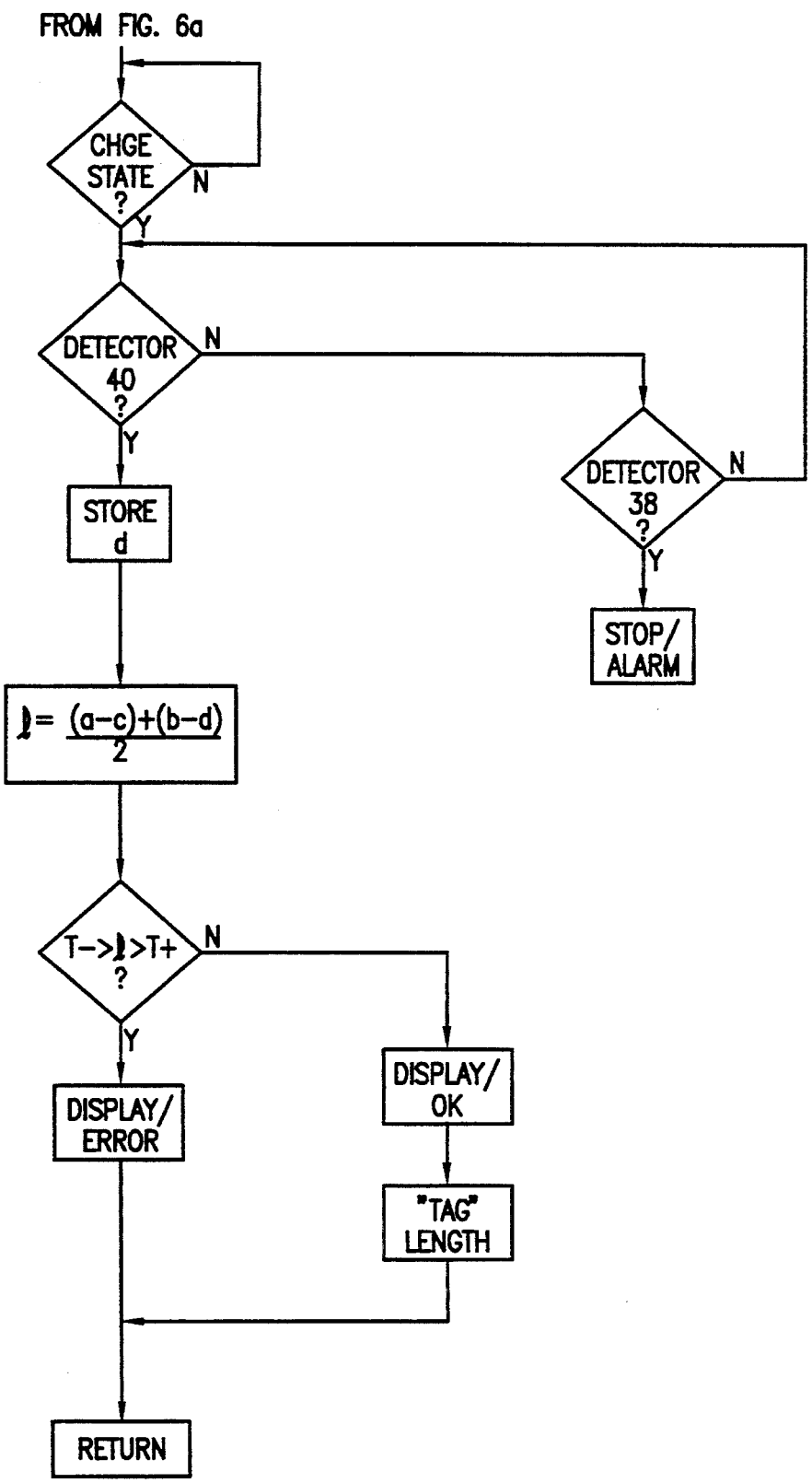

A simplified flow diagram of the operation is shown in FIGS. 6a and 6b.

Figures 7, 7A:
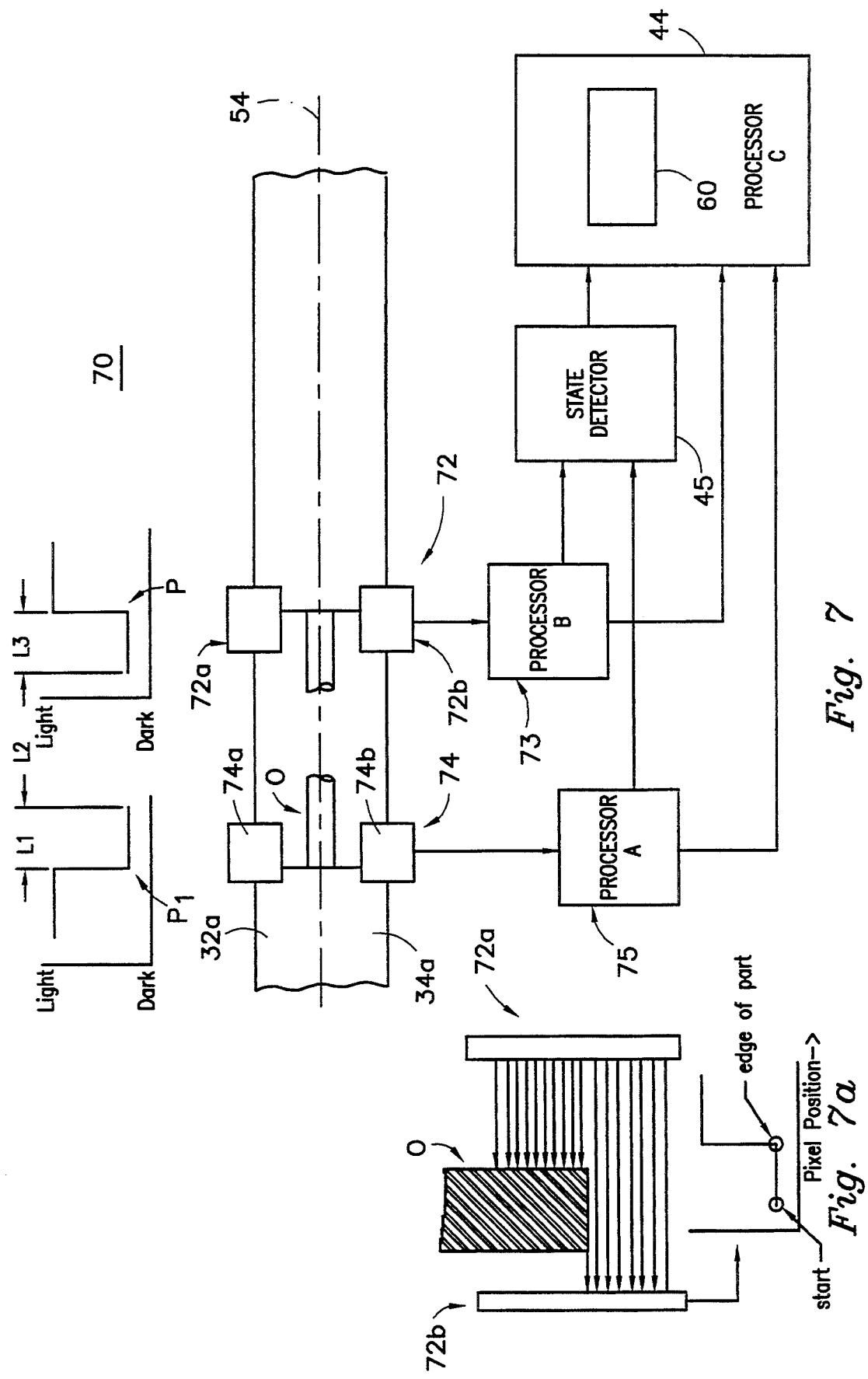
FIGS. 7 and 9 are schematic diagrams showing other alternative embodiments for the measuring system of FIG. 5 and which may be incorporated in the conveying system of FIG. 4.
FIG. 7a is a detailed view of the measuring devices respectively shown in FIG. 7.
Figure 9:
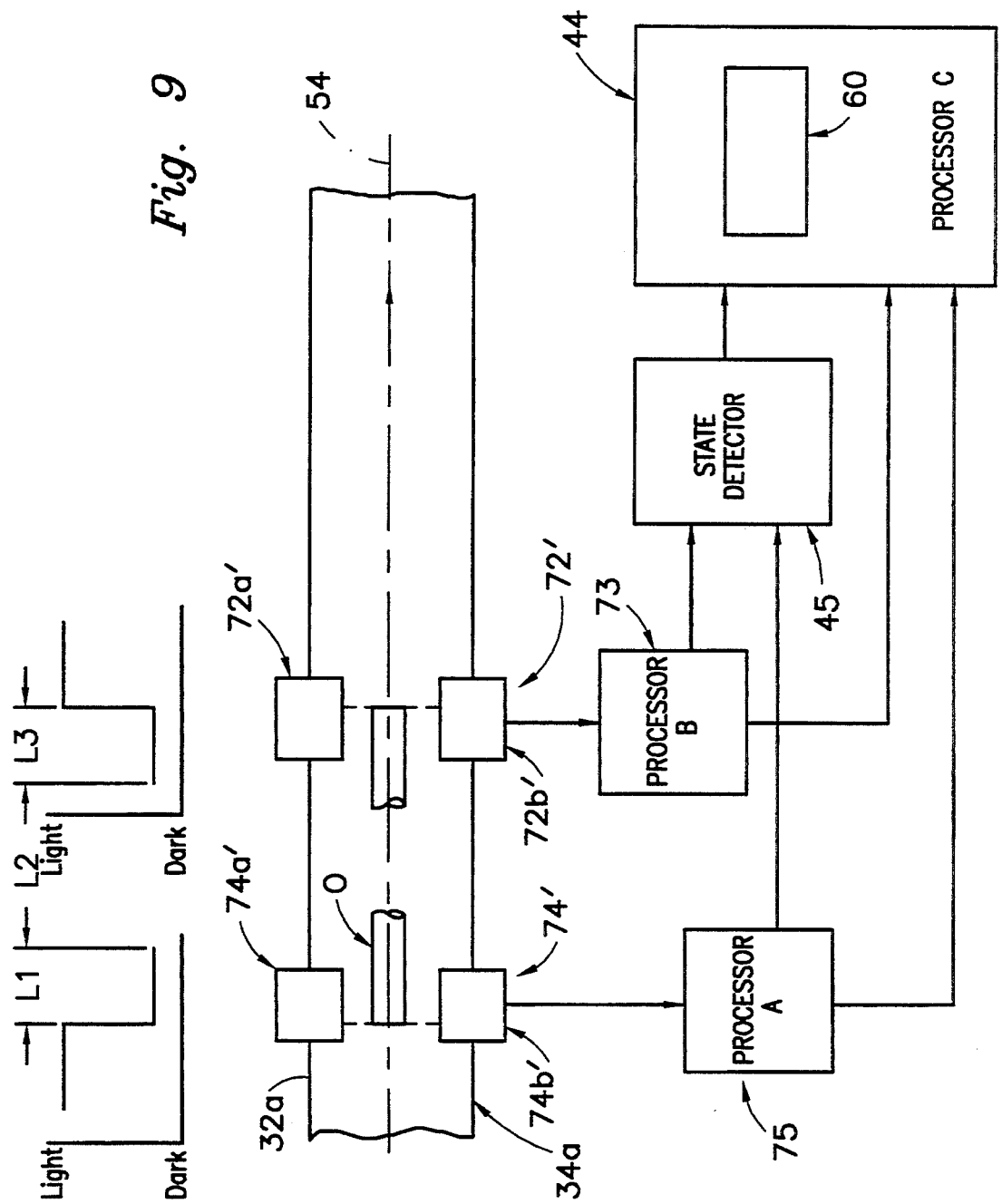

FIGS. 7 and 9 show alternative embodiments which may be employed with the conveyor system of FIG. 4 in place of the measurement system of FIG. 5 and which eliminates the need for measuring the travel distance of the conveying means.

As shown in FIG. 7, the measuring system 70 comprises a microprocessor 44, state detection circuit 45 and LCD display 60 of the type employed in FIG. 5, for example. Detection of cut lengths, for example, is obtained through the employment of photo-diode arrays 72 and 74 which directly measure the product. The product O which is moved along the conveyors 32a, 34a and is substantially aligned with the longitudinal axis 54, moves into position between the sensors 72, 74.

The sensors are similar in design and function. As a result only one sensor will be described in detail for the sake of brevity.

The sensor 72 is shown in greater detail in FIG. 7a and is comprised of an array of light sources 72a serving as a transmitter and an array of photo-diodes or a CCD array 72b serving as a receiver, the units 72a, 72b and 74a, 74b being arranged at positions similar to those respectively occupied by devices 38a, 38b shown in FIG. 4.

The system geometry is known in that sensors 72 and 74 are spaced apart by a known distance i.e. so that the distance between reference points $R_1$ and $R_2$ is known. Light sources in the transmitter repeatedly scan in the direction shown by an arrow in FIG. 7a.

When both receiver arrays 72b, 74b are at least partially blocked by the product 0 as shown in FIG. 7a state detection circuit 45 signals processor 44 to initiate the readings.

Figure 8:
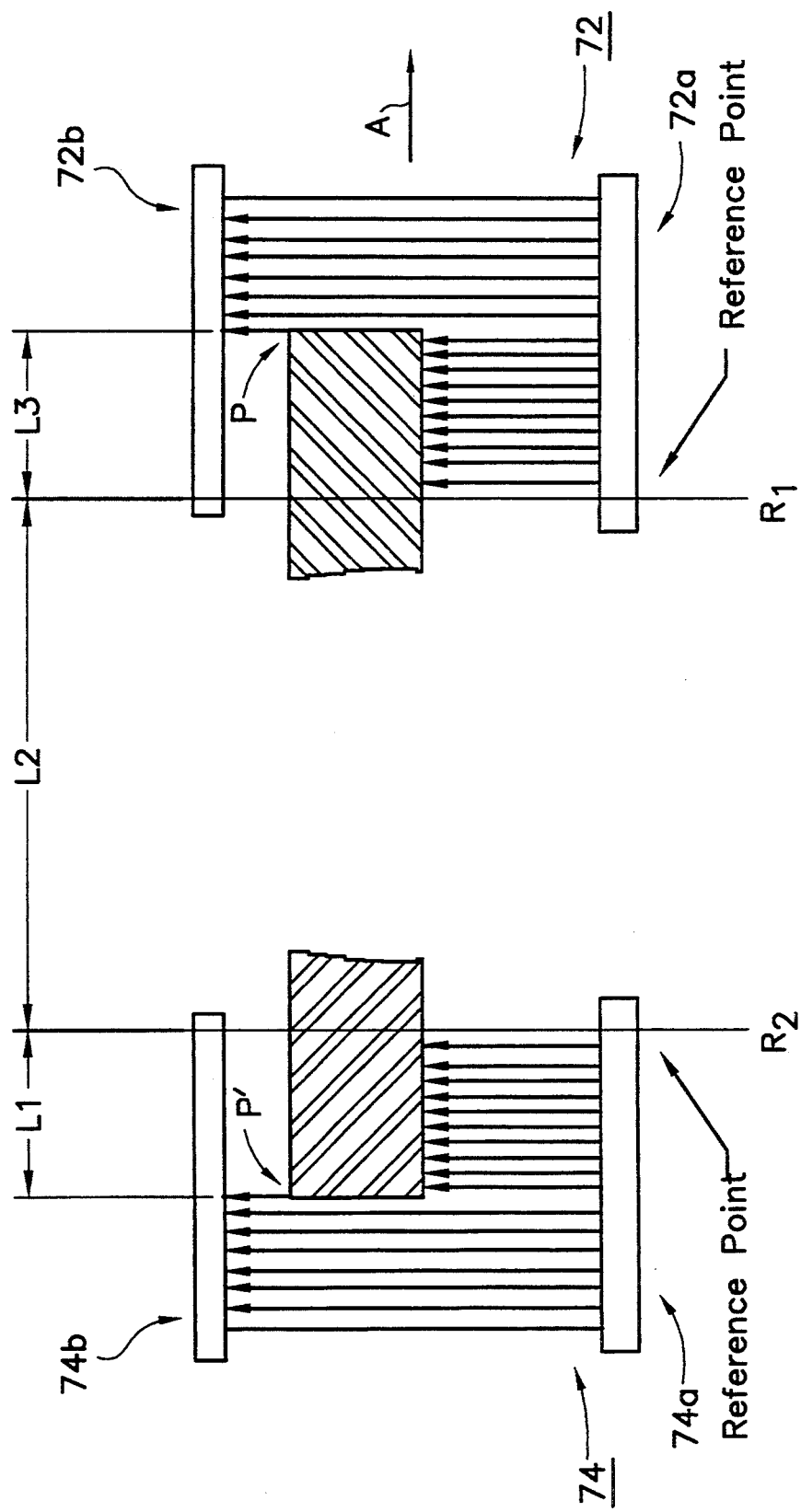
FIG. 8 is a view of two scanning sensors useful in explaining the operation of the systems of FIGS. 7 and 9.

FIG. 8 shows an example of a measurement being taken. The processor 73, 75 for each sensor 72, 74 reads each photo diode receiver array and determines the number of light sensing units in receiver 72b (and 74b) that receive light from an associated light source in transmitter 72a (and 74a) and the number of light sensing units which are blocked by the presence of product 0. For example, with regard to the sensor 74, the point P1 at which light is blocked from a sensor and at which the next light sensor is unblocked represents the end of the product 0 which is moved by the conveyor in the direction shown by arrow A.

The processors 73 and 75 determine the position and the physical sensor where the transition between receipt of light and blockage of light takes place (point P for sensor 72 and $P^1$ for sensor 74). The distance L3 between a reference point $R_1$, and the transition point P is determined for sensor 72. In a similar fashion the distance L1 between reference point $R_2$ and the transition $P^1$ is determined. The distance L2 between reference points $R_1$ and $R_2$ is a known distance as was mentioned hereinabove. The sum of distances L1, L2 and L3 is the length of the product 0.

Several measurements are taken at suitable time intervals which may be at intervals in the range of 0.001 seconds to 0.010 seconds, for example. The readings are then averaged to increase measurement accuracy. Deviations from the average may be used to qualify the measurement.

FIG. 9 shows an arrangement similar to that shown in FIG. 7 wherein the light source transmitter arrays of sensors 72, 74 of FIG. 7 are replaced by a laser beam scanning device $72^1$, $74^1$. The transmitters $72a^1$ and $74a^1$ project a narrow beam of laser light with virtually no diffusion, eliminating interference from ambient light and other factors, to assure precise measurement. The laser beam is reflected by conventional rotating mirrors (not shown) to "scan" the beam along a parallel path. A collimator lens (not shown) collimates the laser beam and projects a "curtain" of light toward a receiving lens which focuses the light onto a photo detector (receiver) $72b^1$ $74b^1$.

The edge mode (i.e. transition between blocked and unblocked laser light) is detected by the receivers $72b^1$, $74b^1$ in a manner similar to that shown and described in connection with FIG. 8.

The distance L3 between the reference point $R_1$ and the transition P (see FIG. 8) and the distance L1 between the reference point $R_2$ and the transition $P^1$ are determined. These distance values are summed with the known distance L2 between reference points $R_1$ and $R_2$ to obtain a length measurement for product 0. Several measurements are taken and the results of the measurements are averaged, to enhance measurement accuracy. Any discrepancy between the averaged value be used to qualify and "flag" the measurement result.

The laser scan rate is typically 100 scans per second. Measurements may be taken during selective ones of the scans. For example, measurements may be taken during three (3) of the scans which are 0.05 seconds apart from one another. A larger number of measurements may be taken, if desired. Also more than one measurement may be taken during the same scan, if desired.

The laser scanner may, for example, be a LaserMike Scanner manufactured by Lasermike, Dayton, Ohio. Any other suitable laser scanner may be used, if desired.

The sensors of FIG. 7 typically have a length of from 1 to 5 inches. The sensors are movable so that the distance L2 between reference points $R_1$ and $R_2$ may be adjusted to accommodate runs of objects of different lengths. A typical laser scanner may have a scanning length in the range from 0.001 inch up to about 19 inches.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein described.

What is claimed is:

1. Apparatus for measuring a length of an elongated, slender workpiece, comprising:

V-shaped conveyor means comprising first and second conveyor surfaces arranged to define an included angle of a predetermined value, said workpiece resting at a lower end of each of said surfaces adjacent an apex of said V-shaped configuration;

means for moving said first and second conveyor surfaces at substantially the same speed, whereby said surfaces, in turn advance said workpiece;

said lower ends of said conveying surfaces being spaced from one another at said apex to provide a gap therebetween;

sensor means including means for generating a beam and means for detecting the presence or absence of said beam, said sensor means being aligned in spatial relation to said conveying surfaces so that said beam projects through said gap whereby passage of a workpiece along the lower ends of said first and second conveyor means interrupts said beam;

means responsive to a change of state of said detector means for generating a control signal; and computing means responsive to successive changes of state for computing a length of a workpiece passing along said conveyor means.

2. The apparatus of claim 1 further comprising means for generating pulses representative of a displacement distance of at least one of said conveyor surfaces;

said computing means utilizing said pulses, together with successive changes in state of said detector means for calculating a length measurement.

3. The apparatus of claim 1 further comprising means for generating pulses representative of the a displacement distance of at least one of said conveying surfaces;

said computing means utilizing said pulses, together with said successive changes in state of said detector means for calculating a length measurement;

said computing means further including counting means for counting said pulses; and means for temporarily storing counts at each change of state and means for subtracting one of said stored counts from the remaining one of said stored counts to compute a length measurement.

4. The apparatus of claim 1 wherein said slender, elongated workpiece comprises an elongated, rod-shaped member.

5. The apparatus of claim 4 wherein said rod-shaped member is an extruded tubular member.

6. The apparatus of claim 4 wherein said rod-shaped member is an extruded tubular member.

7. The apparatus of claim 1 further comprising:

means for comparing a computed measurement with a predetermined tolerance; and means for identifying when said measurement lies within or outside of said tolerance.

8. The apparatus of claim 7 further comprising means for diverting measured workpieces to a first location when a measured value is within said tolerance and for diverting measured lengths of workpieces to a reject location when a measured length lies outside of said tolerance.

9. The apparatus of claim 7 further comprising:

means for tagging a measured workpiece length when the measured value obtained is outside of said tolerance.

10. The apparatus of claim 1 wherein said sensor means comprises a light source for generating a narrow beam of light and a light detector for detecting the presence or absence of said beam.

11. The apparatus of claim 10 wherein said light source and said light detector are arranged adjacent one another and adjacent to said gap and further comprising reflector means arranged adjacent a longitudinal side of a conveyor surface opposite said gap for reflecting a light beam from said light source toward said light detector.

12. The apparatus of claim 1 wherein said sensor means is aligned adjacent opposing ends of one of said conveying surfaces so that said beam extends parallel to one of said conveying surfaces and projects through said gap.

13. The apparatus of claim 1 wherein said slender, elongated workpiece comprises a flexible elongated member.

14. Apparatus for measuring a length of an elongated, slender workpiece, comprising:

V-shaped conveyor means comprising first and second conveyor surfaces arranged to define an included angle of a predetermined value, said workpiece resting at a lower end of each of said surfaces adjacent an apex of said V-shaped configuration;

means for moving said first and second conveyor surfaces at substantially the same speed, whereby said surfaces, in turn, advance said workpiece;

said lower ends of said conveying surfaces being spaced from one another at said apex to provide a gap therebetween;

first and second sensor means respectively including first and second means for generating a beam and respectively including first and second means for detecting the presence or absence of said beam, said first and second means being aligned in spatial relation to said conveying surfaces so that said beam projects through said gap whereby passage of a workpiece along the lower ends of said first and second conveyor means interrupts said beam;

said first and second sensor means being arranged at spaced intervals along a path of movement of said first and second conveyor surfaces;

means responsive to a change of state of said each of detector means for generating a control signal; and computing means responsive to successive changes of state for computing an average length of each of said detector means of a workpiece passing along said conveyor means by averaging the length measurements obtained from said first and second detector means.

15. The apparatus of claim 14 further comprising means for generating pulses representative of a velocity of movement of at least one of said conveyor surfaces;

said computing means utilizing said pulses, together with successive changes in state of said first and second detector means for calculating a length measurement for each of said first and second detector means.

16. The apparatus of claim 14 further comprising means for generating pulses representative of the velocity of movement of at least one of said conveying surfaces;

said computing means utilizing said pulses, together with said successive changes in state of said first and second detector means for calculating a length measurement for each of said first and second detector means;

said computing means further including counting means for counting said pulses; and means for temporarily storing counts at each change of state of each of said first and second detector means and means for subtracting one of said stored counts from the remaining one of said stored counts for each of said first and second detector means to compute a length measurement associated within one of said first and second detector means.

17. The apparatus of claim 16 wherein said computer means includes means for indicating an error when a count generated responsive to a given change of state of an upstream detector means is greater than a count generated responsive to a similar given change of state of a downstream detector means.

18. The apparatus of claim 14 wherein said slender, elongated workpiece comprises an elongated substantially rod-shaped member.

19. The apparatus of claim 14 further comprising:
means for comparing a computed measurement with a predetermined tolerance; and
means for identifying when said measurement lies within or outside of said tolerance.

20. The apparatus of claim 19 further comprising means for diverting measured workpieces to a first location when said measurement is within said tolerance and for diverting measured lengths of workpieces to a reject location when said measurement lies outside of said tolerance.

21. The apparatus of claim 19 further comprising:
means for tagging a measured workpiece length when the measured value obtained is outside of said tolerance.

22. The apparatus of claim 14 wherein said detector means comprises a light source for generating a narrow beam of light and a light detector for detecting the presence or absence of said beam.

23. The apparatus of claim 22 wherein said light source and said light detector are arranged adjacent one another and adjacent to said gap and further comprising reflector means arranged adjacent a longitudinal side of a conveyor surface opposite said gap for reflecting a light beam from said light source toward said light detector.

24. The apparatus of claim 14 wherein said computing means computes a value representing a difference between a first change of state of said first and said second detector means and means for comparing said difference with a value representing a given distance between said first and second detector means to confirm accuracy of said apparatus.

25. The apparatus of claim 14 wherein said first and second sensor means are aligned adjacent opposing ends of one of said conveying surfaces so that said beam extends parallel to one of said conveying surfaces and projects through said gap.

26. The apparatus of claim 14 wherein said slender, elongated workpiece comprises a flexible elongated member.

27. Apparatus for measuring a length of an elongated, slender workpiece, comprising:
V-shaped conveyor means comprising first and second conveyor surfaces arranged to define an included angle of a predetermined value, said workpiece resting at a lower end of each of said surfaces adjacent an apex of said V-shaped configuration;
means for moving said first and second conveyor surfaces at substantially the same speed, whereby said surfaces, in turn, advance said workpiece;
said lower ends of said conveying surfaces being spaced from one another at said apex to provide a gap therebetween;
plural sensor means spaced apart along the conveyor means, each including means for generating a beam and scanning said beam along an array of means for detecting the presence or absence of said beam, said beam generating and scanning means and said array of detector means being aligned in relation to said conveying surfaces so that said scanning beam projects through said gap whereby passage of a workpiece in a region along the lower ends of said first and second conveyor means interrupts said scanning beam;
means responsive to a transition of a detecting means receiving a light beam and an adjacent detecting means which is blocked from receiving a light beam for determining a transition position; and
computing means responsive to transition positions from said detector means of said plural sensor means for computing a length of a workpiece passing along said conveyor means.

28. The apparatus of claim 27 wherein each of said beam generating and scanning means includes means for repeatedly causing said generate beam to scan its associated array of detecting means; and
said computing means including means for averaging the lengths computed during selected ones of said scans.

29. The apparatus of claim 28 wherein said beam generating and scanning means comprises an array of light beam generating means and means for selectively energizing said light beam generating means to scan its associated array of detecting means.

30. The apparatus of claim 29 wherein said array of detecting means comprises an array of photo-diodes.

31. The apparatus of claim 29 wherein said array of detecting means comprises an array of charge-coupled-devices (CCD's).

32. The apparatus of claim 28 wherein said beam generating and scanning means comprises means for generating a laser beam and means for causing said laser beam to scan its associated array of detecting means.

33. The apparatus of claim 28 wherein said beam generating and scanning means comprises means for generating a laser beam to repeatedly scan said array of detecting means.

34. The apparatus of claim 27 wherein said plural sensor means are aligned adjacent opposing ends of one of said conveying surfaces so that said beam extends parallel to one of said conveying surfaces and projects through said gap.

35. Apparatus for measuring a length of an elongated, slender workpiece, comprising:
V-shaped conveyor means comprising first and second conveyor surfaces arranged to define an included angle of a predetermined value, said workpiece resting at a lower end of each of said surfaces adjacent an apex of said V-shaped configuration;
means for moving said first and second conveyor surfaces at substantially the same speed, whereby said surfaces, in turn, advance said workpiece;
said lower ends of said conveying surfaces being spaced from one another at said apex to provide a gap therebetween;
a plurality of sensor means each including means for generating a beam and scanning said beam across an array of detecting means for detecting a blocked or unblocked beam;
said beam generating and scanning means and said array of detecting means being aligned in spatial relation to said conveying surfaces so that said beam projects through said gap whereby passage of a workpiece along the lower ends of said first and second conveyor means interrupts said beam;
said plurality of sensor means being arranged at spaced intervals along a path of movement of said first and second conveyor surfaces;
means responsive to a transition state wherein one detecting means of each array receives a beam and an adjacent detecting means is blocked from receiving a beam for generating a transition signal position; and
computing means responsive to several transition signal positions from each sensor means for computing several length measurements of a workpiece and including means for computing an average length of a workpiece passing along said conveyor means by averaging the several computed length measurements.

36. The apparatus of claim 35 wherein said beam generating and scanning means and said array of detecting means are aligned adjacent opposing ends of one of said conveying surfaces so that said beam extends parallel to one of said conveying surfaces and projects through said gap.

37. A method for measuring slender, elongated lengths of material comprising:
providing a substantially V-shaped conveyor assembly and operating the assembly at a given speed, the V-shaped conveyor assembly defining a predetermined included angle;
advancing a cut length of material along said V-shaped conveyor assembly, said cut length of material resting at a base of said V-shaped conveyor assembly;
detecting passage of said cut length at a given position along said conveyor assembly by passing a beam through a gap provided at the base of said V-shaped conveyor means and detecting a change of state when a length of material selectively blocks and unblocks said beam;
developing a count representative of the speed of movement of said V-shaped conveyor means wherein each count represents a given incremental unit of distance travel;
obtaining a count at two successive changes of state of said beam due to passage of a length of material at a detector position; and
taking the difference between said counts for determining a length.

38. The method of claim 37 further comprising determining whether the measured amount falls within predetermined tolerance limits and providing an indication when a length of material falls outside of said tolerance limits.

39. The method of claim 37 further comprising the step of tagging a length of material when its measurement falls out of the tolerance limits.

40. The method of claim 37 further comprising the step of deflecting a length of material to a reject location when a measured value for said length of material is outside of the aforementioned predetermined tolerance limits.

41. A method for measuring slender, elongated lengths of material comprising:
providing a substantially V-shaped conveyor assembly and operating the assembly at a given speed, the V-shaped conveyor assembly defining a predetermined included angle;
advancing a length of material along said assembly with the length of material resting at a base of said V-shaped conveyor assembly;
detecting a passage of said length of material at a plurality of positions along said conveyor assembly by passing a beam at each of said plurality of positions through a gap provided at the base of said V-shaped conveyor assembly and detecting a change of state when a length of material selectively blocks and unblocks each said beam;
developing a count representative of the speed of movement of said V-shaped conveyor means wherein each count represents a given incremental unit of distance travel;
obtaining a count at two successive changes of state of each of said beams due to passage of a length of material at each position;
determining a length at each position of each beam based on a difference between the counts associated with each of said beams for determining a length measurement at each such position; and
obtaining an average of said length measurements.

42. The method of claim 41 further comprising determining whether the average length falls within predetermined tolerance limits and providing an indication when a length measurement falls outside of said tolerance limits.

43. The method of claim 41 further comprising the step of tagging a length of material when its measurement falls out of the tolerance limits.

44. The method of claim 41 further comprising the step of deflecting a length of material to a reject location when a measured value for said length of material is outside of the aforementioned predetermined tolerance limits.

45. The method of claim 41 further comprising the steps of:
   determining a difference between counts developed when a leading edge of a length of material interrupts said first and second beams; and
   indicating a measurement error when said difference differs from a value representing an actual distance between said beam positions by an amount greater than a predetermined tolerance value.

46. A method for measuring slender, elongated lengths of material comprising:
   (a) providing a substantially V-shaped conveyor assembly and operating the assembly at a substantially given speed, the V-shaped conveyor assembly defining a predetermined included angle;
   (b) advancing a length of material along said V-shaped conveyor assembly, said length of material resting at a base of said V-shaped conveyor assembly;
   (c) detecting passage of said length at two given positions a predetermined spaced distance apart along said conveyor assembly by scanning a beam through a gap provided at the base of said V-shaped conveyor means and detecting a position of a transition state where a length of material interrupts said beam of each of said two positions;
   (d) determining a distance between a reference point at each of said two positions and a location of said transition state; and
   (e) summing the distances obtained in step (d) and the predetermined spaced distance to provide a length measurement for the length of material being measured.

47. The method of claim 46 wherein the step (c) further comprises the step of repeatedly scanning the beam along a given path length; and
   determining the position of transition states for selective ones of said repeated beams scans at said two positions; steps (d) and (e) being repeated for each selective beam scan; and
   further comprising the step of forming an average length measurement based on the several measurements obtained from steps (d) and (e).

* * * * *